March 24, 1942. A. J. McCONNELL 2,277,523
PROTECTIVE ARRANGEMENT FOR ELECTRIC SYSTEMS
Filed June 14, 1940
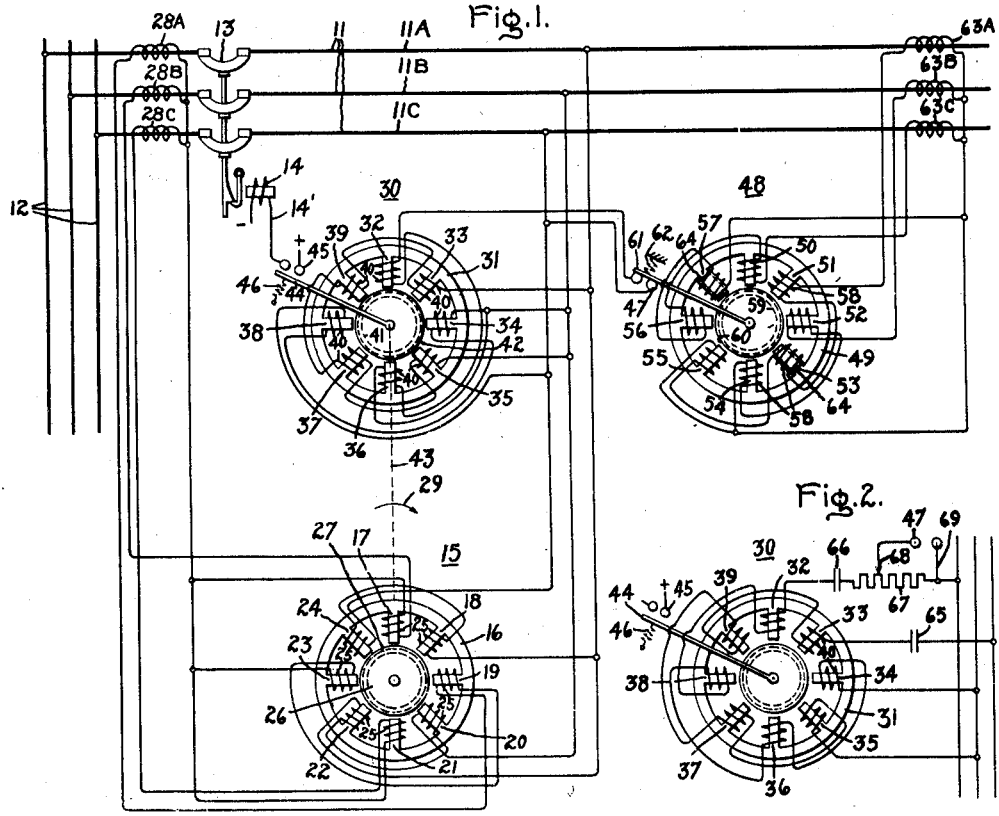
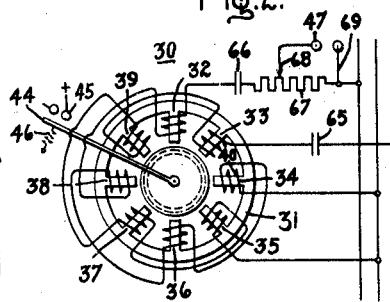
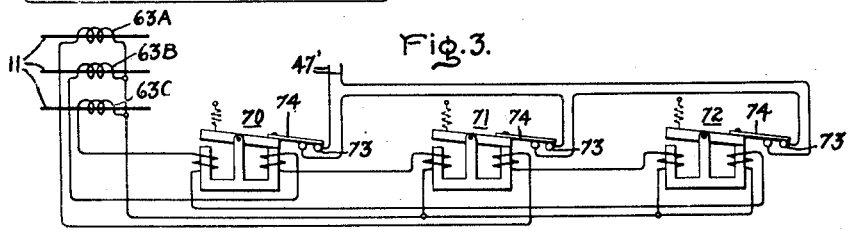
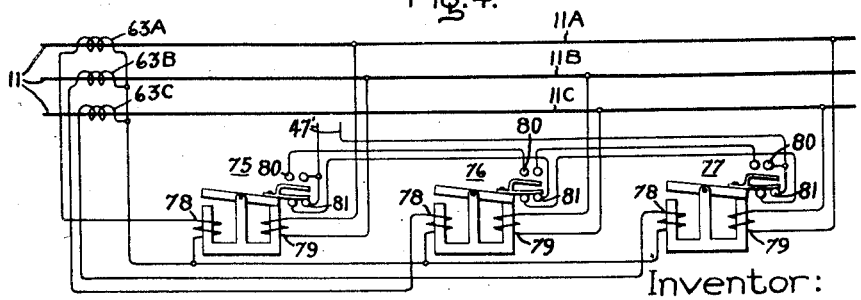
Inventor:
Andrew J. McConnell,
by Harry E. Dunham
His Attorney.

Patented Mar. 24, 1942

2,277,523

UNITED STATES PATENT OFFICE 2,277,523

PROTECTIVE ARRANGEMENT FOR ELECTRIC SYSTEMS

Andrew J. McConnell, Upper Darby, Pa., assignor to General Electric Company, a corporation of New York Application June 14, 1940, Serial No. 340,522

16 Claims. (Cl. 175—294)

My invention relates to protective arrangements for electric systems and more particularly to protective arrangements which embody so-called "distance relays"; that is, fault-responsive relays whose operation is dependent on an impedance characteristic of the circuit to be protected between the relay location and the fault.

In the manufacture of polyphase wattmetric devices, such as wattmeters and power directional relays, it has been customary to use two or more electric current-conducting rotors, such as disks, for example, on a single shaft with one or more electromagnetic means on each rotor for producing a torque thereon. Such devices, because of their size, require a relatively large space and switchboard area. Also, since they have a low efficiency and high inertia, they do not meet the present day relay requirements for high speed and torque. Moreover, when in connection with a polyphase power directional relay it is desired to use voltage restraint as disclosed in United States Letters Patent 1,883,839 of R. L. Webb, the construction becomes further involved by the addition of another electromagnetic torque-producing means.

In my prior United States Letters Patent 2,110,673 there is disclosed and claimed a polyphase electroresponsive device which has a number of purposes, among them that of a power directional relay, which eliminates the difficulties enumerated above by providing a high torque and fast operation. Furthermore, this electroresponsive device serving as a polyphase directional relay requires only one electric current conducting rotor. If a voltage restraint were provided for the polyphase power directional relay a polyphase distance relay would be obtained. Heretofore, single phase distance relays have been used almost exclusively, thereby requiring a large number of separate relays and consequently greatly increasing the cost. It would be desirable to provide a polyphase distance relay so that a single relay would give complete protection against phase faults, while another polyphase distance relay would protect against ground faults instead of requiring three separate phase-fault relays and three separate ground fault relays as was necessary with the single-phase distance relays of the prior art when protecting three phase systems.

It was discovered that single phase distance relays, when used for protecting polyphase systems would have a different reach for phase faults involving only two conductors hereinafter referred to as phase-to-phase faults, than for faults involving all the phases, such as a three-phase fault in a three-phase circuit and, consequently, the distance response of the relay was different for these different types of faults even though the fault in each case was at the same distance from the relay. In United States Letters Patent 2,008,498 granted July 16, 1935, upon an application of Erich Gross and assigned to the assignee of the present application, there is disclosed an arrangement for causing single-phase distance relays used in protecting a polyphase circuit to operate similarly for faults at a predetermined distance from said relay independently from the number of circuit conductors involved in the fault. In polyphase distance relays, I have found that the reach of the relay on a three-phase fault is also considerably greater than for a phase-to-phase fault.

Accordingly, it is an object of my invention to provide a polyphase power directional distance relay having the same operation for all faults within a predetermined distance therefrom independently of the number of conductors involved in the fault.

It is another object of my invention to provide a quadrature connected polyphase power directional relay with voltage restraint including means for varying the restraint in response to other than balanced faults.

It is still another object of my invention to provide a three-phase distance relay with a quadrature connected directional element having the same reach for three-phase faults as on phase-to-phase faults.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which Fig. 1 is a schematic diagram of a protective arrangement for electric systems embodying my invention, and Figs. 2, 3, and 4 represent certain modifications of various parts of the arrangement illustrated in Fig. 1.

In order to simplify the drawing and the description, I have shown my invention as applied to a polyphase system protected only against phase faults. It will, of course, be understood by those skilled in the art that ground-fault protection may also be provided by additional means, not shown. Referring now to Fig. 1, I have illustrated by invention as applied to a polyphase electric system including a three-phase power line 11 having phase conductors 11A, 11B, and 11C arranged to be connected to a station three-phase bus 12 by any suitable circuit-interrupting means illustrated simply as a latched closed circuit breaker 13. Circuit breaker 13 is provided with a suitable trip coil 14 connected in an energizing circuit comprising conductor 14'. In the event of a phase fault occurring on power line 11, it is desirable to cause tripping of circuit breaker 13 so as to isolate this line from station bus 12. If, on the other hand, the fault is outside of power line 11, it is undesirable to trip circuit breaker 13 since the necessary protection will be provided by other circuit breakers (not shown) arranged to isolate the faulty section.

In order to accomplish tripping of circuit breaker 13 only when a fault occurs on power line 11, it is necessary to provide an electroresponsive device which distinguishes between power flowing to line 11 from station bus 12 and power flowing from power line 11 to station bus 12. Accordingly, I provide a polyphase power directional relay 15 arranged to tend to cause tripping of circuit breaker 13 in the event of power flow from station bus 12 to line 11, which might indicate a fault on power line 11, but which would prevent tripping of circuit breaker 13 when the power flow is in the opposite direction to indicate a fault outside of power line 11. Electroresponsive device or relay 15 is similar in construction to the electroresponsive device disclosed and claimed in United States Letters Patent 2,110,686 granted March 8, 1938, upon an application of V. E. Verrall and assigned to the assignee of the present application. As shown in Fig. 1, the power directional relay comprising electroresponsive device 15 includes a hollow magnetic stator 16 having a plurality of inwardly projecting salients 17 to 24, inclusive. A plurality of windings 25 one for each salient are provided for energizing the salients as a central magnetic member 26 concentrically positioned with respect to the ends of the salients whereby to actuate a rotor 27 which is movable in the gaps between the salients and the stator 26, the rotor being secured to a suitably journaled shaft.

The windings 25 of polyphase directional relay or electroresponsive device 15 are preferably arranged to be energized in a manner equivalent to the so-called "quadrature connection" heretofore used with multiple-disk polyphase relays, that is, the torque on rotor 27 is produced by the interaction of fluxes, one proportional to a current component of the system and the other proportional to a voltage component of the system which are displaced in phase from one another by ninety electrical degrees. Obviously, the so-called "quadrature connection" can be obtained by various arrangements of connections of windings 25. In my prior United States Patent 2,110,673, I have disclosed in Tables I and II arrangements $B_1$ and $D_1$ for obtaining the equivalent of a quadrature connection. Similarly, another arrangement of a quadrature connected power directional relay is shown by element 17 of Fig. 1 of my prior United States Patent 2,160,599.

I have illustrated the windings 25 of power directional relay 15 associated with salients 17, 19, 21, and 23, respectively, as energized with currents $I_B$, $I_A$, $I_C$ and $I_A$, where the subscripts A, B, and C refer to the particular phases of power line 11 from which the current components are obtained through the respective current transformers 28A, 28B, and 28C. In order to provide the quadrature arrangement, the windings 25 associated with salients 18, 20, 22, and 24 are energized respectively with voltage components as follows: $E_{AC}$, $-E_{AB}$, $E_{AB}$, and $-E_{AC}$, where $E_{AB}$ is the line-to-line voltage across conductors 11A and 11B, etc. By this arrangement, the resultant torque on rotor 27 is proportional to $\Sigma \ EI \cos (\phi+\theta)$, where E and I represent respectively the current and voltage of the circuits, $\phi$ the angle at which the current lags the voltage of the system, and $\phi$ the angle of lead (current leading voltage) at which maximum torque occurs in the relay.

The windings 25 on power directional relay 15 are so arranged that the resultant torque is due only to the interaction of fluxes associated with adjacent salients. In other words, there are no second order torques involving the product of two currents or two voltages from non-adjacent salients since, in the first place, these torques are very small and, in the second place, by the arrangement of the windings, they neutralize each other and reduce to zero. Torques due to the interaction of fluxes associated with remote salients are so small as to be negligible.

When the circuit breaker 13 is closed and power flows from station bus 12 to power line 11, the quadrature connected power directional relay 15 will cause a clockwise torque to be produced on rotor 27 causing clockwise rotation thereof as indicated by the arrow 29 of Fig. 1. In order to prevent relay 15 from causing tripping of circuit breaker 13 under normal power flow from station bus 12 to power line 11, it is necessary to provide a restraining means which restraint becomes ineffective when abnormal conditions occur on power line 11. Accordingly, I provide electroresponsive device 30 which preferably is of similar construction with that of electroresponsive device 15 and comprises a hollow magnetic stator 31 having a plurality of inwardly projecting salients 32 to 39, inclusive. Each of these salients is provided with a winding 40 for energizing the salients as well as a central magnetic member 41 concentrically positioned with respect to the ends of the salients whereby to actuate a rotor 42 which is movable in the gaps between the salients and stator 41. The rotors 27 and 42 of electroresponsive devices 15 and 30, respectively, are interconnected by a shaft 43. Secured to the shaft 43 so as to move therewith is a movable contact-controlling member 44, which is arranged to control contacts 45 in the circuit of the trip coil 14 and which are preferably biased to the open-circuit position by a spring 46.

The windings 40 of electroresponsive device 30 must be energized to produce a restraining torque on shaft 43 which restraint is removed under fault conditions on power line 11. Accordingly, I energize the windings 40 of electroresponsive device 30 with line-to-line voltages from power line 11 so as to provide a voltage restraint of the type disclosed and broadly claimed in the above referred to United States Letters Patent 1,883,839 to R. L. Webb. This voltage restraint is dependent on two different voltages of the circuit and the phase relationship therebetween so as to produce restraining torque proportional to the area of the voltage triangle as set forth in detail in the above-mentioned Webb patent. I accomplish this result by energizing the windings 40 associated with salients 33, 35, 37, and 39, respectively, with voltages $E_{AB}$, $-E_{AB}$, $E_{AB}$, and $-E_{AB}$. The windings 40 associated with salients 34 and 38 are energized respectively with voltages $E_{BC}$. It is possible to double the restraint of electroresponsive device 30 by energizing the windings 40 associated with salients 32 and 36 with voltages $-E_{BC}$.

Electroresponsive devices 15 and 30 together form a polyphase power directional distance relay having a reach which is the distance from the relay on power line 11 to the point where a fault causes the torque of power directional relay 15 to just equal the restraining torque of electroresponsive device 30. At a distance beyond this point, the restraining means comprising electroresponsive device 30 would produce a larger torque than relay 15 and, hence, prevent tripping of circuit breaker 13. For faults closer to the distance relay than the point referred to above, the torque produced by power directional relay 15 will predominate and cause tripping of circuit breaker 13. It can be shown that a power directional distance relay comprising devices 15 and 30 will operate for three-phase faults at a considerably greater distance from the relay than for phase-to-phase faults. In other words, the distance relay has a greater reach for three-phase faults than for phase-to-phase faults and my invention is particularly concerned with eliminating this discrepancy and providing a distance relay having the same reach for any faults not involving ground. Ground-fault protection may, of course, be provided by a separate suitable protective arrangement.

In order to determine the difference in reach of my above-described polyphase distance relay on three-phase faults than on phase-to-phase faults, it becomes necessary to determine the torques produced by the power directional element and the restraining element under these different fault conditions. As mentioned above, the reach of the distance relay is determined by the point on the line at which a fault occurring thereon provides equal restraining and operating torques on the distance relay, that is, at the maximum distance from a fault for which the relay will operate, the directional torque equals the restraint torque. For greater distances, the restraint torque predominates while, for nearer faults, the directional torque is the stronger one. As is set forth in detail in the above referred to Webb patent, the torque of the restraining element provided with voltage restraint proportional to the area of the voltage triangle for any balanced three-phase voltage condition may be expressed by the following equation setting forth the product of half the base times the altitude of the voltage triangle:

$$T_R = \frac{1}{2} E_1 K \sin 60° E_1 \quad (1)$$

or $$T_R = \frac{3\sqrt{3}}{4} K e_1^2 \quad (2)$$

where $T_R$ = torque, $K$ is the design constant, $E_1$ is the balanced line-to-line voltage, and $e_1$ is the line to neutral voltage (positive-phase-sequence).

As set forth in detail in my article entitled "A Single Element Polyphase Directional Relay" appearing at page 77 of the January, 1937, issue of Electrical Engineering, the general torque equation in terms of positive and negative-phase-sequence components of a quadrature connected polyphase power directional relay may be expressed by the following equation:

$$T_0 = 3\sqrt{3} K_1 [e_1 I_1 \cos(\phi_1 - 90 + \theta) + e_2 I_2 \cos(\phi_2 + 90 + \theta)] \quad (3)$$

where $T_0$ is the torque, $K_1$ is a constant, $\phi_1$ is the angle by which $I_1$ lags $e_1$, $\phi_2$ is the angle by which $I_2$ lags $e_2$, $\theta$ is a design constant, that is, the angle of lead (current leading voltage) at which maximum torque of a pair of adjacent salients occurs, $I_1$ is the positive-phase-sequence line current, $I_2$ is the negative-phase-sequence line current, and $e_2$ is the line-to-neutral negative-phase-sequence voltage.

During a three-phase fault, the voltage at the relay is the drop in the line between the fault and the relay or $$e_1 = I_1 Z_3 \quad (4)$$

where $Z_3$ is the impedance of the maximum length line for which the relay will operate on a three-phase fault. On a three-phase fault, there is, of course, no negative-phase-sequence component of current and voltage and Equation 3 therefore reduces to the following equation:

$$T_{0_3} = 3\sqrt{3} K_1 e_1 I_1 \cos(\phi_1 - 90 + \theta) \quad (5)$$

The reach for the three-phase fault is determined by the impedance of the length of line at which the operating and restraining torques of the distance relay are equal. Hence, equating the torques of Equations 2 and 5, the following relationship is obtained:

$$K e_1 = 4 K_1 I_1 \cos(\phi_1 - 90 + \theta) \quad (6)$$

By substituting for $e_1$ from Equation 4 and solving for the three-phase impedance between the relay and the fault located at the maximum reach of the relay, the following equation is obtained:

$$Z_3 = \frac{4 K_1}{K} \cos(\phi_1 - 90 + \theta) \quad (7)$$

For a single-phase fault, the positive and negative-phase sequence voltages are equal at the point of fault and are one-half of the generated positive-phase-sequence voltages. Where the positive and negative-phase-sequence reactances of the system are equal (and they usually are nearly so), each of these voltages may be expressed as follows:

$$e_2 = -I_2 Z_2 = I_1 Z_s = e_1 \quad (8)$$

where $Z_s$ is the system impedance from the relay to the fault (positive or negative phase sequence).

The restraining torque for a single-phase fault is again the area of the voltage triangle as set forth above having the same altitude as under balanced three-phase conditions but having a smaller base which depends upon the voltage drop in the line between the fault and the relay. The altitude of the voltage triangle equals $$\frac{3}{2}(e_1 + e_2) = 3 I_1 Z_s \quad (9)$$

The restraining torque for a single-phase fault may, therefore, be expressed by the following equation:

$$T_{R_1} = \frac{1}{2} K 3 I_1 Z_s 2\sqrt{3} I_1 Z_1 = 3\sqrt{3} K I_1^2 Z_1 Z_s \quad (10)$$

where $Z_1$ is the line-to-neutral (positive-phase-sequence) impedance of the maximum length of line for which the relay will operate on a single-phase fault. The positive-phase-sequence voltage at the relay may be expressed as follows:

$$e_1 = I_1(Z_s + Z_1) \quad (11)$$

and the negative-phase-sequence voltage at the relay may be expressed as follows:

$$e_2 = I_2(Z_s = Z_1) \quad (12)$$

Substituting these voltages in Equation 3, the total operating torque on the directional element of the distance relay for a single-phase fault may be expressed by the following equation:

$$T_{0_1} = 3\sqrt{3}\,K_1[I_1{}^2(Z_s + Z_1)\cos(\phi_1 - 90 + \theta) \\ + I_2{}^2(Z_s - Z_1)\cos(\phi_2 + 90 + \theta)] \quad (13)$$

For the maximum reach of the distance relay on single-phase faults $T_{R_1} = T_{0_1}$ and $Z_s = Z_1$. Therefore, equating Equations 10 and 13 and substituting $Z_1$ for $Z_s$, one obtains the following equation:

$$3\sqrt{3}\,K I_1{}^2 Z_1{}^2 = 6\sqrt{3}\,K_1 I_1{}^2 Z_1 \cos(\phi_1 - 90 + \theta) \quad (14)$$

and solving for $Z_1$ $$Z_1 = \frac{2K_1}{K}\cos(\phi_1 - 90 + \theta) \quad (15)$$

By comparing Equations 7 and 15, it is observed that the impedance of the maximum length of line for which the relay will operate on a three-phase fault is always twice as great as the impedance of the maximum length of line for which the relay will operate on a phase-to-phase fault or, in other words, the distance relay disclosed in Fig. 1 without additional means will reach twice as far on a three-phase fault as on a phase-to-phase fault.

In accordance with my invention, I provide means by which the distance relay comprising electroresponsive devices 15 and 30 has the same reach for single-phase as for three-phase faults and I accomplish this by cutting the restraining torque in half on phase-to-phase faults. In Fig. 1, a pair of contacts 47 are connected in the energizing circuit of the windings 40 associated with salients 32 and 36. When contacts 47 are bridged or closed, twice the restraining force is provided by electroresponsive device 30 as when these contacts are open.

It is, therefore, necessary to distinguish between phase-to-phase and three-phase faults and various means for accomplishing this may be provided. Since on three-phase faults the currents and voltages are balanced, negative-phase-sequence components are not present and, therefore, a negative-phase-sequence current or voltage relay may be provided to distinguish between three-phase and phase-to-phase faults. Accordingly, in Fig. 1, I have shown a negative-phase-sequence current relay 48 which comprises an electroresponsive device identical with that disclosed and claimed in my copending application, Serial No. 333,377, filed May 4, 1940, and assigned to the assignee of the present application. Electroresponsive device 48 is very similar in construction to electroresponsive devices 15 and 30 and includes a hollow magnetic stator 49 having a plurality of inwardly projecting salients 50 to 57, inclusive. A plurality of windings 58, one for each salient, are provided for energizing purposes to produce flux in the respective salients and also in a central magnetic member 59 concentrically positioned with respect to the ends of the salients whereby to actuate a rotor 60 which is movable in the gaps between the salients and the stator 59. Attached to the rotor 60 is a suitable conducting member 61 for bridging contacts 47, and a spring means 62 normally biases these contacts to closed position. The windings 58 associated with respective salients 50 to 57 are energized in a predetermined manner from current transformers 63A, 63B, and 63C, respectively, associated with the different phases of power line 11. Salients 53 and 57 are each provided with a copper sleeve 64 for flux-shifting purposes, and the relay is designed to produce clockwise rotation of rotor 60 upon the occurrence of negative-phase-sequence currents in power line 11 as described in my above referred to copending application.

The operation of negative-phase-sequence current relay 48 is fully described in my above-mentioned copending application and no further discussion will be included herewith. Whenever a phase-to-phase fault occurs on power line 11, negative-phase-sequence currents will flow and electroresponsive device 48 will cause opening of contacts 47 so as to reduce the restraining torque produced by electroresponsive device 30 by one half. A three-phase fault does not involve negative-phase-sequence currents and, accordingly, the full restraint of electroresponsive device 30 is provided under such conditions whereby the reach on single-phase faults of my polyphase directional distance relay is identical with the reach on three-phase faults.

It will be understood by those skilled in the art that other means of varying the restraint of electroresponsive device 30 may be provided than by interrupting the circuit which energizes certain of the salients of the restraining means. In Fig. 2, I have shown electroresponsive device 30 with the various parts thereof designated by the same reference numerals and having the windings 40 of salients 33, 35, 37, and 39 energized in the same manner as in Fig. 1. Connected in series with these windings is a capacitor 65 for tuning the circuit including the windings 40 connected in series therewith to approximate resonance. The remaining windings 40 associated with salients 32, 34, 36, and 38 are connected in series and energized with the same potentials as the corresponding salients in Fig. 1. However, instead of providing two separate circuits in parallel as in Fig. 1, all of the last-mentioned windings are connected in series with one another and with a capacitor 66 and a resistor 67. The capacitance 66 tunes the circuit associated therewith to approximate resonance so that, if the amount of resistance of resistor 67 connected in series therewith is varied, no phase-angle change or consequent change in torque of the relay will result. Resistor 67 is provided with taps 68 and 69 connected to contacts 47 similar to those shown in Fig. 1, and by shorting out a portion of resistor 67 by bridging contacts 47, the restraint of electroresponsive device 30 as shown in Fig. 2 will be doubled. Interrupting the circuit at contacts 47 will reduce the current flowing through windings 40 associated with salients 32, 34, 36, and 38 so as to reduce the restraining torque to one-half the former value. Tap 68 is indicated as an adjustable tap by means of which this two-to-one relationship may be obtained.

Although in Fig. 1 I have disclosed a negative-phase-sequence current relay for distinguishing between three-phase and phase-to-phase faults, it will be understood that other means for distinguishing between these faults may be used, such as a negative-phase-sequence voltage relay, three voltage relays, three impedance relays, three current-balance relays, three voltage-balance relays, etc. In Fig. 3, I have illustrated three current-balance relays 70, 71, and 72 which may be used in place of electroresponsive device 48 of Fig. 1. These current-balance relays are energized from current transformers 63A, 63B, and 63C so as to balance one phase current against another in a manner well understood by those skilled in the art. Any unbalanced fault, such as a phase-to-phase fault, will cause operation of certain of the relays whereas a three-phase fault will not affect the relays since the currents are still balanced against one another. Each of the relays 70, 71, and 72 is provided with contacts 73 connected in series with one another and arranged to be bridged by member 74 associated with the armature of the current-balance relay. This series circuit embodying contacts 73 of the respective current-balance relays would be connected across contacts 47 of Fig. 1 or 2 so as to reduce the restraint on single-phase faults by one half but allow the full restraining torque of electroresponsive device 30 to be effective on three-phase faults.

In Fig. 4, I have illustrated three impedance relays 75, 76, and 77 provided with current windings 78 energized from current transformers 63A, 63B, and 63C, respectively, in a manner known to those skilled in the art to produce a relay-operating torque and voltage windings 79 arranged to be energized from power line 11 so as to provide the necessary voltage restraint. Each of these relays is arranged to control two sets of contacts 80 and 81, respectively. The sets of contacts 80 are connected in series with one another and a circuit 47' while the sets of contacts 81 are also connected in series with circuit 47' but in parallel with contacts 80. Under balanced power conditions, that is, on normal current conditions or on three-phase faults, all of the contacts 81 or all of the contacts 80 are closed so that, if circuit 47' were connected to the contacts 47 of Fig. 1 or 2, the full restraining torque of electroresponsive device 30 would be provided. It will be understood by those skilled in the art that contacts 80 and 81 are arranged to be controlled so that contacts 80 for example are completed before contacts 81 are interrupted. Any unbalanced fault, such as a phase-to-phase fault, will cause only one or two of the impedance relays 75, 76, or 77 to operate and, hence, interrupt circuit 47' which, if connected to contacts 47 of Fig. 1 or 2, would reduce the restraint which electroresponsive device 30 would produce on the shaft 43 associated with power directional relay 15 by one half.

From the above discussion it is observed that my polyphase distance relay has the same reach on single-phase as on three-phase faults. The restraint provided by electroresponsive device 30 will, of course, also be cut in half in the event of a ground fault but, as mentioned above, this type of fault may be taken care of in some other manner as by the provision of ground-fault protection distance relays.

While I have shown and described particular embodiments of my invention relating to a polyphase power directional distance relay, I do not desire my invention to be limited to the arrangement shown and described for it will, of course, be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, a polyphase circuit, fault-responsive protective means therefor including a polyphase directional relay arranged to be energized in accordance with the voltage and current of the circuit for operation in accordance with an impedance characteristic between the relay location and a fault including a polyphase restraining means for preventing the operation of said relay until a predetermined condition occurs on said circuit, and means for varying said restraint in response to the type of predetermined condition occurring on said circuit.

2. In combination, a three-phase circuit, fault-responsive protective means therefor including a three-phase directional relay having cooperating current and voltage windings energized from said circuit, a restraining means for said relay, and means for causing said relay to have the same reach for three-phase faults as for phase-to-phase faults upon said circuit including means for varying the restraint exerted by said restraining means in accordance with the type of fault.

3. In combination, a three-phase circuit, fault-responsive protective means therefor including a three-phase quadrature connected directional relay having cooperating current and voltage windings energized from said circuit, a polyphase restraining means for said relay, and means operative upon the occurrence of a phase-to-phase fault for reducing said restraint by one-half so that said relay has the same reach for three-phase as for phase-to-phase faults.

4. In combination, a polyphase circuit, fault-responsive protective means therefor including a power directional relay having cooperating current and voltage windings energized from said circuit, voltage restraint means for said relay, and a negative-phase-sequence responsive means for varying said restraint upon the occurrence of a phase-to-phase fault so that said relay has the same reach independently of the number of conductors involved in said fault.

5. In a protective arrangement for a polyphase alternating-current power system, a polyphase power directional relay arranged to be energized in accordance with the voltage and current of said system so as to produce a torque on a single rotating current-conducting member, voltage-restraint means for said member comprising an electroresponsive device including a plurality of windings energized by predetermined voltage quantities of said system, and means for varying the effect of said last-mentioned means on said member in response to predetermined fault conditions on said power system by interrupting the circuit of certain of the windings of said electroresponsive device.

6. In a protective arrangement for a polyphase alternating-current power system, a polyphase power directional relay having a movable member, said relay being energized in accordance with the voltage and current of said system so as to produce an operating torque on a movable member when the power flow in said system is in a predetermined direction, voltage-restraint means for said movable element comprising an electroresponsive device including a plurality of windings energized by predetermined voltage quantities of said system, and means for varying the restraint of said last-mentioned means on said movable member in response to predetermined fault conditions on said power system by varying the energization of certain of the windings of said electroresponsive device.

7. In a protective arrangement for a polyphase alternating-current power system, a polyphase power directional relay including a movable member, said relay being arranged to produce an operating torque on said movable member when the power flow in said system is in a predetermined direction, means responsive to predetermined electrical quantities of said power system for producing a restraining torque on said movable member, said last-mentioned means comprising an electroresponsive device including a plurality of windings and associated energizing circuits, and means for varying the effect of said restraining torque on said movable member under certain predetermined fault conditions by varying the impedance of the energizing circuit associated with one of said energizing windings.

8. In combination with a polyphase alternating-current circuit, an electroresponsive device comprising a movable member, means for exerting on said member an operating torque when a predetermined direction of power flow occurs in said alternating-current circuit, a second electroresponsive device arranged to produce a restraining torque on said movable member in response to predetermined electrical quantities of said alternating-current circuit, and means for varying the torque produced by said second electroresponsive device comprising a third electroresponsive device responsive to predetermined electrical conditions in said alternating-current circuit.

9. In a protective arrangement for a three-phase alternating-current power system, a three-phase distance relay comprising an electroresponsive device having a movable member, a first means for exerting on said member an operating torque dependent upon a predetermined direction of power flow in said system, a second means for exerting a restraining torque on said member variable in response to certain predetermined electrical quantities of said system, and means for distinguishing between phase-to-phase and three-phase faults on said system for varying the effect of said second means so that said relay has the same reach independently of the number of conductors involved in said fault.

10. In combination, a three-phase circuit, fault-responsive protective means therefor including a power directional relay having cooperating current and voltage windings energized from said circuit, voltage-restraint means for said relay, and a plurality of impedance relays connected in a circuit so as to distinguish between phase-to-phase and three-phase faults on said circuit, said impedance relays being arranged to vary said restraining means upon the occurrence of phase-to-phase faults so that said power directional relay has the same reach for three-phase as for phase-to-phase faults.

11. In combination, a three-phase circuit, fault-responsive protective means therefor including a power directional relay having cooperating current and voltage windings energized from said circuit, voltage-restraint means for said relay, and a plurality of current-balance relays connected in a circuit so as to distinguish between phase-to-phase and three-phase faults on said circuit, said current-balance relays being arranged to vary said restraining means upon the occurrence of phase-to-phase faults so that said power directional relay has the same reach for three-phase as for phase-to-phase faults.

12. In combination, a three-phase circuit, fault-responsive protective means therefor including a power directional relay having cooperating current and voltage windings energized from said circuit, voltage-restraint means for said relay, and a negative-phase-sequence current relay for distinguishing between phase-to-phase and three-phase faults on said circuit arranged to vary said restraining means upon the occurrence of phase-to-phase faults so that said power directional relay has the same reach for three-phase as for phase-to-phase faults.

13. In combination with a polyphase alternating-current circuit, an electroresponsive device comprising a movable member, means for exerting an operating torque on said member when a predetermined direction of power flow occurs in said alternating-current circuit, means for producing a restraining torque on said movable member in response to predetermined electrical quantities of said alternating-current circuit, and means responsive to predetermined electrical conditions in said alternating-current circuit for varying the resultant torque exerted on said movable member.

14. In combination with a three-phase alternating-current circuit, an electroresponsive device comprising a rotatable member, means for exerting an operating torque on said member when a predetermined direction of power flow occurs on said alternating-current circuit, means for exerting a restraining torque on said member in response to predetermined voltage quantities of said alternating-current circuit, and means distinguished between phase-to-phase and three-phase faults on said circuit for varying the resultant torque exerted on said member.

15. In combination with a polyphase alternating-current circuit, a distance-responsive device having cooperating current and voltage windings, voltage restraint means for said device and a negative-phase-sequence responsive means for varying said restraint upon the occurrence of a phase-to-phase fault so that said distance-responsive device has the same reach for all phase faults independently of the number of conductors involved in said faults.

16. In combination with a polyphase alternating-current circuit, a polyphase distance relay having a single movable element, a plurality of current and potential windings for exerting an operating torque on said member, a plurality of additional windings for exerting a restraining torque on said element, and means responsive to a predetermined electric condition on said alternating-current circuit for varying the restraining torque exerted on said movable member so that said distance relay has the same distance response for three-phase faults occurring on said circuit as for all phase-to-phase faults which might occur on said circuit.

ANDREW J. McCONNELL.

CERTIFICATE OF CORRECTION.

Patent No. 2,277,523. March 24, 1942.

ANDREW J. McCONNELL.

It is hereby certified that error appears in the printed specification of the above numbered patent requiring correction as follows: Page 1, second column, line 55, for "by" read --my--; page 5, first column, line 49, after "faults" and before the period insert --and is an improvement on the invention disclosed and claimed in the copending application of A. R. van C. Warrington, Serial No. 375,208, filed January 21, 1941, and assigned to the same assignee as the present application--; and that the said Letters Patent should be read with this correction therein that the same may conform to the record of the case in the Patent Office.

Signed and sealed this 9th day of June, A. D. 1942.

(Seal)

Henry Van Arsdale,
Acting Commissioner of Patents.